(12) United States Patent
Vila et al.

(10) Patent No.: US 12,553,015 B2
(45) Date of Patent: Feb. 17, 2026

(54) PROCESS AND DEVICE FOR PRODUCTION OF CULTURED MEAT

(71) Applicant: BIOTECH FOODS S.L., Donostia-San Sebastián (ES)

(72) Inventors: Mercedes Vila, Donostia-San Sebastián (ES); Teresa Lull, Donostia-San Sebastián (ES)

(73) Assignee: BIOTECH FOODS S.L, Donostia-San Sebastián (ES)

( * ) Notice: Subject to any disclaimer, the term of this patent is extended or adjusted under 35 U.S.C. 154(b) by 592 days.

(21) Appl. No.: 18/001,178

(22) PCT Filed: Jun. 12, 2020

(86) PCT No.: PCT/ES2020/070387
§ 371 (c)(1),
(2) Date: Dec. 8, 2022

(87) PCT Pub. No.: WO2021/250292
PCT Pub. Date: Dec. 16, 2021

(65) Prior Publication Data
US 2023/0227760 A1 Jul. 20, 2023

(51) Int. Cl.
*C12M 3/00* (2006.01)
*A23L 13/00* (2016.01)
(Continued)

(52) U.S. Cl.
CPC .............. *C12M 21/08* (2013.01); *A23L 13/00* (2016.08); *C12M 23/34* (2013.01); *C12M 25/14* (2013.01); *C12M 27/02* (2013.01)

(58) Field of Classification Search
CPC ....................................................... C12M 3/00
See application file for complete search history.

(56) References Cited

U.S. PATENT DOCUMENTS

2017/0073625 A1 3/2017 Kasuto et al.

OTHER PUBLICATIONS

International Search Report and Written Opinion issued in corresponding International Application No. PCT/ES2020/070387 dated Feb. 25, 2021.

(Continued)

*Primary Examiner* — Rosanne Kosson
(74) *Attorney, Agent, or Firm* — NORTON ROSE FULBRIGHT US LLP

(57) ABSTRACT

The present invention relates to a process for the production of in vitro engineered tissues, also known in the art as cultured meat, cultivated meat, cell based meat, cellular meat and/or clean meat, and a device for the production of the same. The process comprises the steps of: loading sterilizable 3D scaffolds into a seeding chamber, sterilization of the scaffolds in the seeding chamber, seeding the scaffolds by loading a first volume of culture medium into the seeding chamber, wherein the first volume of culture medium has a density of cells in suspension of 5,000 to 25,000 cell/cm$^2$, more preferably from 10,000 to 16,000 cm$^2$ such that the scaffolds are immersed in the culture medium, leaving the scaffolds and the first volume of culture medium in the seeding chamber for a period of 2-24 hours at 18-37° C., loading a second volume of culture medium into a bioreactor, the second volume being greater than the first volume of the culture medium wherein an incubation position of one or more movable grids inside the bioreactor confines the scaffolds to the second volume of the culture medium such that they remain immersed during an incubation step, wherein the scaffolds and the second volume of culture medium are incubated in the bioreactor for a period of 10-60 days at 18-37° C. and at a pH between 6.5-8.0, more preferably 7.0-7.4. The invention also relates to a device for the production of cultured meat.

13 Claims, 4 Drawing Sheets

(51) Int. Cl.
*C12M 1/00* (2006.01)
*C12M 1/06* (2006.01)
*C12M 1/12* (2006.01)

(56) References Cited

OTHER PUBLICATIONS

Moritz et al., "Alternatives for large-scale production of cultured beef: A review", Journal of Integrative Agriculture, 14(2): 208-216, 2015.
Verbruggen et al., "Bovine myoblast cell production in a microcarriers-based system", *Cytotechnology*, 70:503-512, 2018.

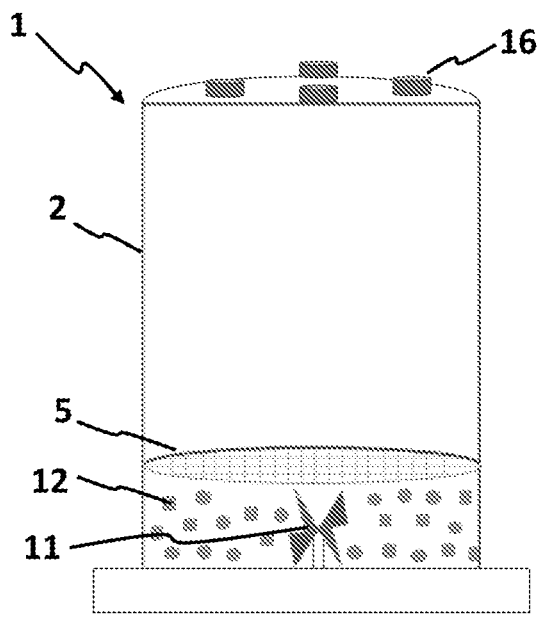
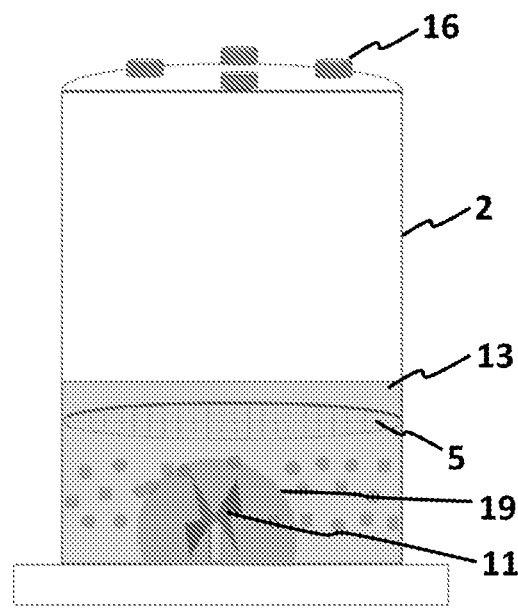
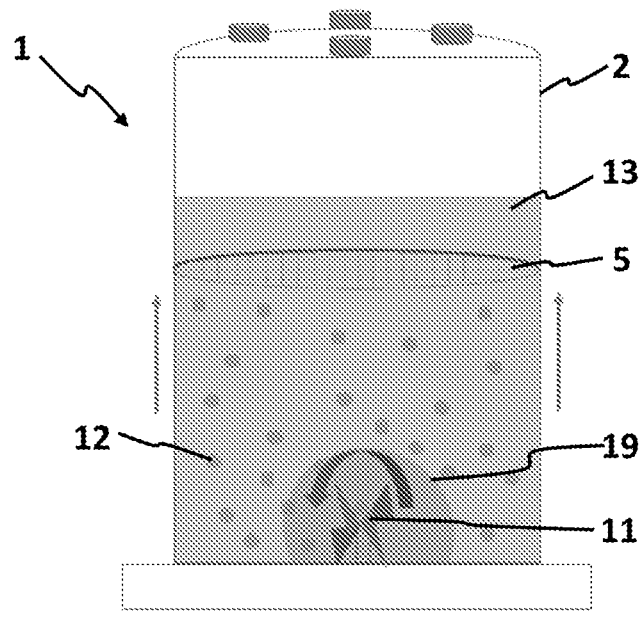
FIG. 1
FIG. 2
FIG. 3

PROCESS AND DEVICE FOR PRODUCTION OF CULTURED MEAT

CROSS REFERENCE TO RELATED APPLICATIONS

The present application is a national phase application under 35 U.S.C. § 371 of International Application No. PCT/ES2020/070387 filed Jun. 12, 2020. The contents of the referenced application are incorporated into the present application by reference.

TECHNICAL FIELD

The present invention relates to the production of in vitro engineered tissues, also known in the art as cultured meat, cultivated meat, cell based meat, cellular meat and/or clean meat, from animal cells, in particular adherent cells such as muscle cells for edible use.

STATE OF THE ART

Human population growth, which is expected to increase continuously (reaching 9,770 million by 2050 and 11,180 million at the turn of the century), will bring along greater waste production and the nutrient requirements of our species will continue to grow as we do. Meat figures prominently among protein foods. As divulged in the information provided by the Food and Agriculture Organization of the United Nations, the FAO (http://www.fao.org/ag/againfo/themes/es/meat/backgr_composition.html), meat is defined by the Codex Alimentarius as "All parts of an animal that are intended for, or have been judged as safe and suitable for, human consumption".

In the last 40 years, global meat production has grown significantly, due mainly to the development of countries. This growth has limited the production system, adversely affecting the environment in terms of natural resources (land and water), human health (pandemics) and animal well-being (animal suffering), due to which the consumption of cultured meat significantly contributes to feeding all the inhabitants of the planet by helping to create a more sustainable system. The FAO estimates that in the next 40 years the demand for animal protein will continue to grow and, in turn, the challenges for satisfying that demand.

The current production model will not be able to satisfy this demand if not combined with new strategies such as cultured meat or meat produced by in vitro cultivation of muscle cells previously extracted from an animal. Accordingly, there is a need for a solution to demands for an alternative to meat produced from live animals.

WO 2015/038988 A1 discloses a method for using edible microcarriers to manufacture engineered meat in a bioreactor, wherein microcarriers are seeded with cells originally extracted from live animals and incubated in the bioreactor for up to 12 days for example. The cellularized microcarriers may be allowed to fuse in agglomerates or layers. The bioreactor disclosed is a stirred tank with a cooling jacket. A suspension of microcarriers in a culture medium fills the internal volume of the bioreactor and the cellularized microcarriers are collected by decanting at the end of the incubation period. As the working volume of the bioreactor disclosed in this publication cannot be varied, the seeding process which requires a higher concentration of cells in a medium must be carried out in a separate smaller chamber.

WO 2006/041429 A2 discloses a method for producing an engineered meat product comprising muscle cells grown ex vivo and attached to a support structure. A plate and a membrane are disclosed as examples of the support structure. The muscle cells may be cultured in bioreactors with static, stirred or dynamic flow, although details of the bioreactors and the scaffolds for use on an industrial scale are not given.

It would therefore be advantageous to provide a production method and a device for the manufacture of cultured meat wherein substantially three-dimensional support structures may be used, wherein both the seeding and the incubation may be carried out in the bioreactor and wherein the working volume of the bioreactor may be varied.

DESCRIPTION OF THE INVENTION

A process for the production of cultured meat is provided. The process comprises the steps of: loading sterilizable 3D scaffolds into a seeding chamber, sterilization of the scaffolds in the seeding chamber, seeding the scaffolds by loading a first volume of culture medium into the seeding chamber, wherein the first volume of culture medium has a density of cells in suspension of 5,000 to 25,000 cells/cm$^2$, more preferably from 10,000 to 16,000 cells/cm$^2$, such that the scaffolds are immersed in the culture medium, leaving the scaffolds and the first volume of culture medium in the seeding chamber for a period of 2-24 hours at 18-37° C., loading a second volume of culture medium into a bioreactor, the second volume being greater than the first volume of the culture medium wherein an incubation position of one or more movable grids inside the bioreactor confines the scaffolds to the second volume of the culture medium such that they remain immersed during an incubation step, wherein the scaffolds and the second volume of culture medium are incubated in the bioreactor for a period of 10-60 days at 18-37° C. and at a pH between 7.2-7.4.

The seeding chamber may be defined inside the bioreactor by a seeding position of the one or more movable grids.

The scaffolds may be left to stand in the seeding chamber without agitation during the seeding step.

The seeding chamber may be a pre-chamber external to the bioreactor, wherein the scaffolds immersed in the first volume of culture medium may be transferred to the bioreactor before the second volume of culture medium is loaded into the bioreactor.

The external seeding pre-chamber may be programmed to be subjected to 360° rest-turn cycles jointly with peristaltic movement during the seeding step before the scaffolds are left to stand in the seeding chamber.

An agitator inside the bioreactor may be activated after loading the second volume of culture medium such that the scaffolds move freely in suspension.

A movement of the one or more grids may be caused by the agitation of the second volume of culture medium in the bioreactor, such that the incubation volume defined by the grids is the volume occupied by the scaffolds moving freely in suspension in the bioreactor whilst remaining immersed in the culture medium.

The position of the one or more grids may also be controlled manually or automatically.

The first volume of culture medium may be 5-20% of the whole volume of the bioreactor, more preferably 5-10%.

The process may further comprise continuous or intermittent control of the following parameters during incubation: the dissolved oxygen level which should be maintained between 30-60%, the pH which should be maintained between 6.5-8.0, more preferably 7.0-7.4, and the nutrient concentrations.

A device for the production of cultured meat is also provided. The device comprises a bioreactor, the bioreactor comprising: a tank, a cover, an agitator and at least one moveable grid wherein a position of the grid defines at least an incubation volume inside the bioreactor for the incubation of seeded scaffolds in a culture medium.

The moveable grid may be configured to be in a seeding position defining a seeding chamber inside the bioreactor.

The moveable grid may also be configured to be moved to an incubation position defining an incubation volume inside the bioreactor, wherein the incubation volume is greater than the volume of the seeding chamber.

The device may further comprise a seeding pre-chamber external to the bioreactor and connection means for transferring the seeded scaffolds from the pre-chamber to the bioreactor.

The seeding pre-chamber may also comprise means for rotating the pre-chamber in 360° rest-turn cycles.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 is a simplified front view of a first step of a manufacturing process according to a first embodiment of the invention.

FIG. 2 is a front view of the seeding step according to the first embodiment.

FIG. 3 is an illustration of the incubation step according to the first embodiment.

DESCRIPTION OF A WAY OF CARRYING OUT THE INVENTION

Figure 4:
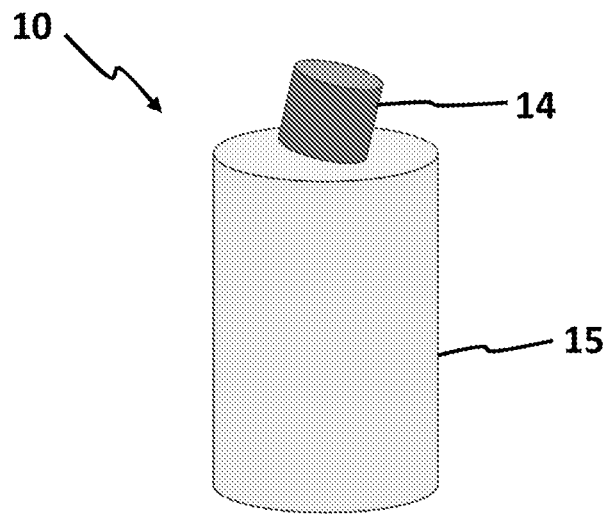
FIG. 4 is a simplified front view of a seeding pre-chamber according to a second embodiment of the invention.

FIG. 1 shows an initial step of the manufacture of tissue with nutritive content or cultured meat from adherent cells, preferably animal muscle cells, according to a first embodiment of the invention. In this embodiment of the invention, the cells are seeded and cultured in the same reactor. The bioreactor comprises a tank 2 and cover 3. The cover and the tank may comprise one or more ports 16 for the loading of the culture medium, the insertion of measuring equipment and electrodes and the removal of waste gases. The measuring equipment may include equipment for measuring temperature, pH, pressure, concentration of glucose in the medium and concentration of metabolic waste products. The air pressure at the top of the tank may be monitored, for example using a pressure gauge, and waste gases may be systematically removed via a port 16 at the top of the reactor 1. The tank 2 may be surrounded by a heating jacket (not shown). The bioreactor may further comprise an agitator 11 and one or more air spargers (also not shown). The air spargers may be used to maintain the required dissolved oxygen levels in the culture medium. The bioreactor may have a volume in the range of 500 mL to 30,000 L, more preferably from 2 L to 5,000 L.

Scaffolds 12 are used to provide a structure for the cell growth. The scaffolds 12 may comprise edible polymers forming a three dimensional architecture with interconnected pores for the passage of gases and culture fluid. The shape of the scaffold of the present invention may be regular (e.g., spherical, rounded, rectangular, square, pyramid, prism, cone, etc.) or irregular. In another preferred embodiment, the size of the scaffolds varies in the range of 100×100 µm to 10×10 cm (a×b), preferably 1×1 mm to 5×5 mm, more preferably 1×1 cm to 3×3 cm to enhance the cellular growth and tissue formation. The dimensions can vary within the stated ranges in an irregular shape where a differs from b.

The scaffolds 12 are loaded into the bioreactor 1. At least one grid 5 is mounted to the inside of the bioreactor. The grid comprises gaps or holes to optimize flow around the tank wherein the diameters of the holes are smaller than a maximum dimension of the scaffolds 12 such that these do not pass through the holes. The grid 5 may have a flat, two-dimensional form or may be three-dimensional to form a dish or basket. The grid 5 is supported inside the bioreactor such that its position in the vertical direction may be varied. For example, the inside of the tank may comprise several vertical grooves and the grids 5 may comprise protrusions which are guided by the grooves to allow this vertical movement. The grid 5 confines the scaffolds 12 to a determined volume of the bioreactor 1, ensuring that they remain immersed in the culture medium when necessary and defining the incubation volume. The bioreactor 1 containing the scaffolds 12 without any culture medium is then sterilized, for example for 20 minutes at a temperature of 121° C. and a pressure of 1 atm. The sterilization may be carried out using steam.

FIG. 2 shows the subsequent seeding process of the first embodiment wherein the separately prepared culture medium is added, for example via a port 16 in the bioreactor 1.

The culture medium contains the muscle cells to be cultured as well as the required nutrients such as glucose. The density of cells in suspension in the culture medium may be 5,000 to 25,000 cells/cm$^2$, more preferably from 10,000 to 16,000 cells/cm$^2$. An initial volume of the culture medium is added such that the scaffolds 12 are immersed in the culture medium as shown in FIG. 2. This is then left to stand, for example for 2-24 hours at 37 C. The chosen time period is sufficient for the cells to adhere to the surfaces of the scaffolds. The temperature of 37° C. is the standard temperature for mammal cells but may be adjusted depending on the type of cells to be cultured. For example, fish or amphibian cells may be seeded at a lower temperature.

FIG. 3 shows the incubation process after a second volume of culture medium is added such that an incubation volume of the bioreactor is filled. The agitator 11 may then be activated to stir the tank to ensure the culture medium reaches the interior surfaces of the scaffolds and to ensure good homogenization. The bioreactor 1 may comprise a protective shield 19 to prevent any scaffolds 12 from being trapped in the agitator 11, especially in the case where no grid 5 separates the scaffolds 12 from the agitator 11. Gentle agitation may be applied through the incubation process to avoid shear stress on the scaffolds' surfaces.

The position of the grid 5 is then raised mechanically, providing a larger incubation zone. The change in position may be effectuated by any of a variety of methods such as: by manually pulling upwards on a metal stem holding the grid, wherein a part of the stem can be accessed from outside of the reactor. Alternatively, the position of the grids may be changed by pneumatic holders or a bearingless magnetic motor. The position of the grids may be controlled automatically. The incubation position of the grid 5 allows a greater volume for the movement of the culture medium and scaffolds and to provide the cells with the oxygen available in the medium.

The seeded scaffolds are then incubated in the bioreactor 1 for 10-30 days at 37° C. Several parameters may be monitored and controlled, manually or using an automated control system. These include the dissolved oxygen level which should be maintained between 30-60%, the pH which should be allowed to vary between 7.0-7.4 and the nutrient concentrations.

Figure 5:
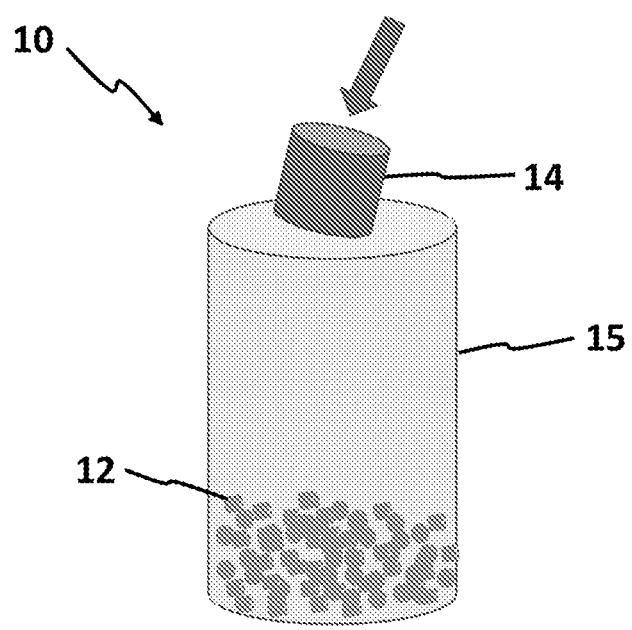
FIG. 5 is an illustration of a first step of a seeding process according to the second embodiment.
Figure 6:
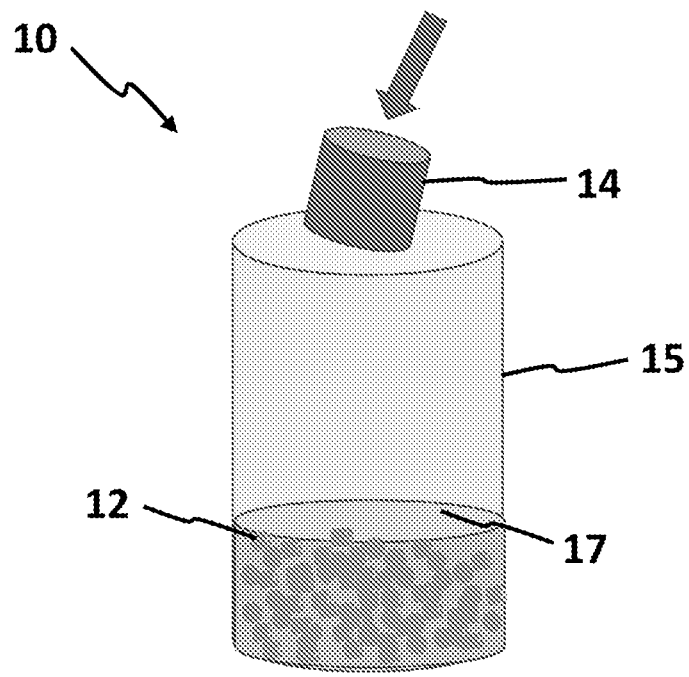
FIG. 6 is an illustration of a second step of a seeding process according to the second embodiment.
Figure 7:
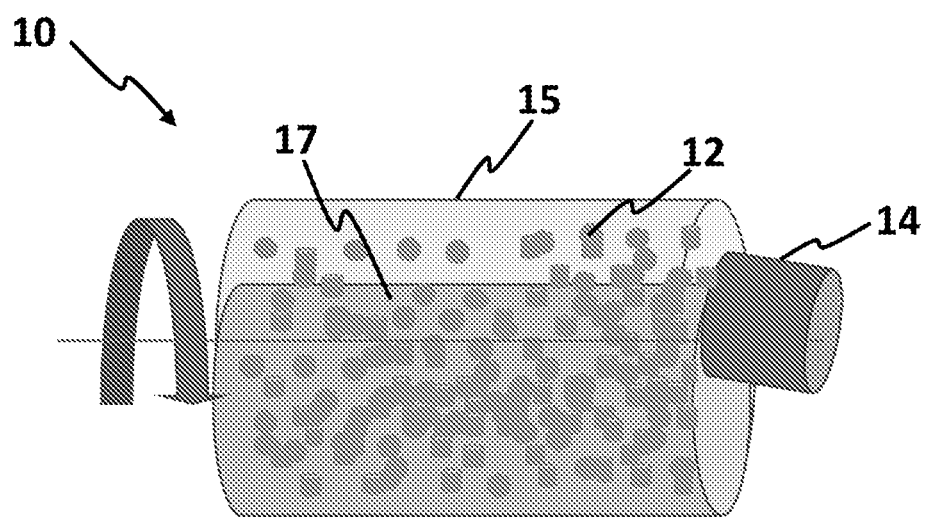
FIG. 7 is an illustration of a third step of a seeding process according to the second embodiment.

FIG. 4 shows a seeding chamber 10 according to a second embodiment, in which the seeding process takes place separately from the bioreactor 1. The seeding chamber comprises a loading port 14 and a tubular main body 15 which has a significantly lower volume than the reactor, wherein the volume of the seeding chamber may be 5-50% of the volume of the reactor. The seeding chamber 10 is loaded with the scaffolds 12 through the port 14 which is illustrated in FIG. 5. The seeding chamber and the scaffolds 12 are then sterilized, for example using hot steam. The scaffolds are then inoculated with a suspension 17 with high cell density which is also loaded through the port 14 as illustrated in FIG. 6. The port 14 is then sealed and the chamber 10 is subjected to a program of 360° axial rest-turn cycles jointly with peristaltic movement in a cradle at 37° C. so that the cell suspension reaches all available surfaces of the scaffold. This is illustrated in FIG. 7. The culture is left to stand in the pre-chamber for 2 to 24 hours at 37° C.

Figure 8:
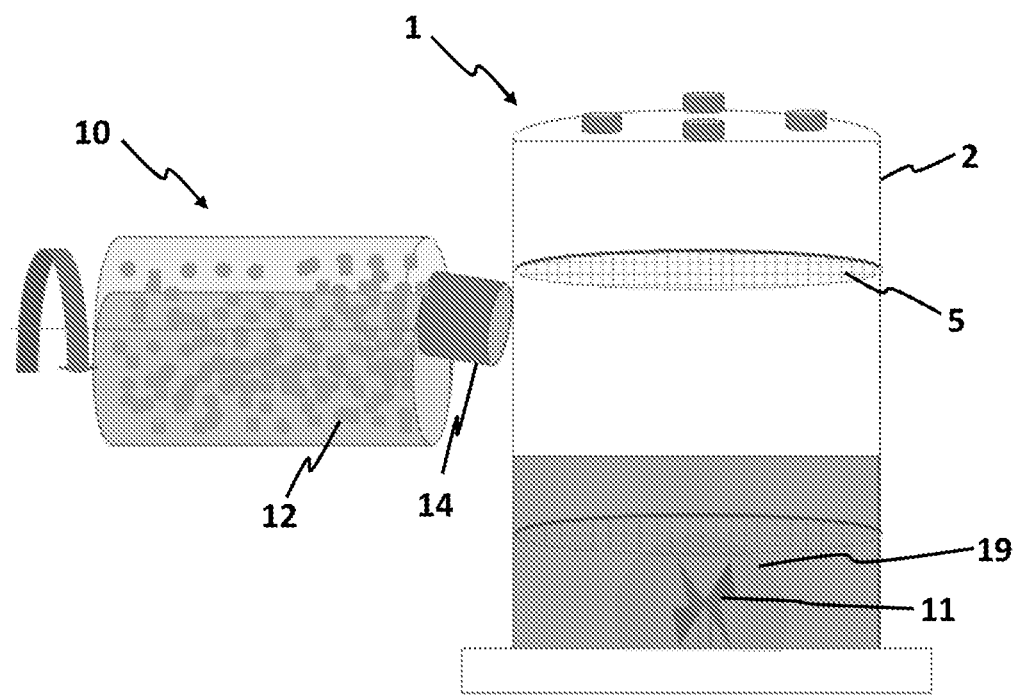
FIG. 8 is an illustration of the transfer of seeded scaffolds from the seeding pre-chamber to the bioreactor.

FIG. 8 shows a process of loading the seeded scaffolds 12 to the bioreactor 1. The bioreactor 1 is first sterilized and filled with culture medium at a volume sufficient to immerse the scaffolds 12. Then, the port 14 of the seeding chamber 10 is connected to a sterile duct in a wall of the tank 2 of the bioreactor at a position between the two grids 5. The grids 5 limit the incubation zone.

Figure 9:
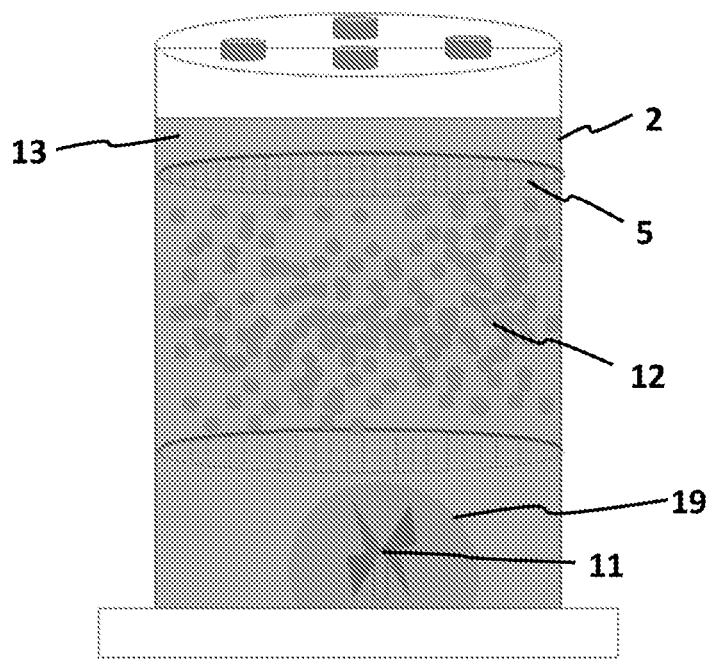
FIG. 9 is a front view of the bioreactor during an incubation step according to the second embodiment.

FIG. 9 shows an incubation process in the bioreactor 1. The agitator 11 is activated to homogenize the medium. The scaffolds are kept in culture for 10 to 60 days, preferably 15 to 30 days, in which the same parameters described in the first embodiment will be controlled. After the culturing process is complete, the bioreactor may be emptied of liquid and the scaffolds may be harvested.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A device for the production of cultured meat comprising a bioreactor (1), the bioreactor comprising:
   (a) a tank (2),
   (b) a cover (3),
   (c) an agitator (11),
   (d) at least one moveable grid (5) wherein a position of the grid (5) defines at least an incubation volume inside the bioreactor for the incubation of seeded scaffolds (12) in a culture medium (13),
   (e) a seeding pre-chamber (10) external to the bioreactor (1) and
   (f) a connector configured to transfer the seeded scaffolds (12) from the pre-chamber (10) to the bioreactor (1).

2. The device of claim 1 wherein the moveable grid (5) is configured to be in a seeding position defining a seeding chamber inside the bioreactor.

3. The device of claim 2 wherein the moveable grid (5) is configured to be moved to an incubation position defining an incubation volume inside the bioreactor, wherein the incubation volume is greater than the volume of the seeding chamber.

4. The device of claim 1 wherein the seeding pre-chamber (10) comprises means for rotating the pre-chamber in 360 degree rest-turn cycles and/or peristaltic movement.

5. A process for the production of cultured meat, by culturing muscle cells in the bioreactor of claim 1, wherein the process comprises the steps of:
   loading sterilizable 3D scaffolds (12) into a seeding chamber,
   sterilization of the scaffolds (12) in the seeding chamber,
   seeding the scaffolds (12) by loading a first volume of culture medium (13) into the seeding chamber, wherein the first volume of culture medium (13) has a density of cells in suspension of 5,000 to 25,000 cell/cm$^2$, more preferably from 10,000 to 16,000 cm$^2$ such that the scaffolds (12) are immersed in the culture medium (13),
   leaving the scaffolds (12) and the first volume of culture medium (13) in the seeding chamber for a period of 2-24 hours at 18-37° C.,
   loading a second volume of culture medium (13) into a bioreactor (1), the second volume being greater than the first volume of the culture medium (13) wherein an incubation position of one or more movable grids (5) inside the bioreactor (1) confines the scaffolds (12) to the second volume of the culture medium (13) such that they remain immersed during an incubation step, wherein the scaffolds (12) and the second volume of culture medium (13) are incubated in the bioreactor (1) for a period of 10-60 days at 18-37° C. and at a pH between 6.5-8.0, more preferably 7.0-7.4.

6. The process of claim 5 wherein the scaffolds (12) are left to stand in the seeding chamber without agitation during the seeding step.

7. The process of claim 5, wherein the scaffolds (12) immersed in the first volume of culture medium (13) are transferred to the bioreactor (1) before the second volume of culture medium (13) is loaded into the bioreactor (1).

8. The process of claim 5 wherein the seeding pre-chamber (10) is programmed to be subjected to 3600 rest-turn cycles jointly with peristaltic movement during the seeding step before the scaffolds (12) are left to stand in the seeding chamber.

9. The process of claim 5 wherein an agitator (11) inside the bioreactor (1) is activated after loading the second volume of culture medium (13) such that the scaffolds (12) move freely in suspension.

10. The process of claim 9 wherein a movement of the one or more grids (5) is caused by the agitation of the second volume of culture medium (13) in the bioreactor (1), such that the incubation volume defined by the grids (5) is the volume occupied by the scaffolds (12) moving freely in suspension in the bioreactor (1) whilst remaining immersed in the culture medium (13).

11. The process of claim 5 wherein the position of the one or more grids (5) is controlled manually or automatically.

12. The process of claim 5 wherein the first volume of culture medium (13) is up to 5-20% of the whole volume of the bioreactor (1).

13. The process of claim 5 wherein the process further comprises continuous or intermittent control of the following parameters during incubation:
   the dissolved oxygen level,
   the pH, and
   the nutrient concentrations.

* * * * *